Dec. 10, 1963 H. A. BEAN, JR 3,113,387
PLUMB BOB WITH RETRACTABLE POINT
Filed Oct. 1, 1959 2 Sheets-Sheet 1
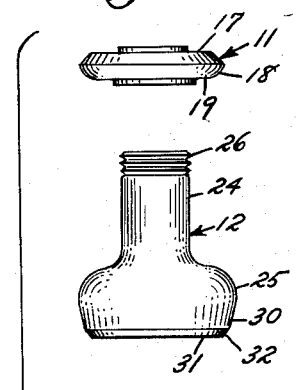
Fig.1
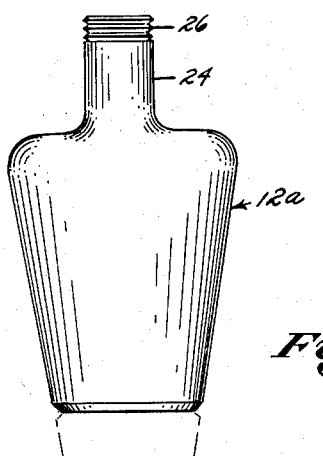
Fig.2
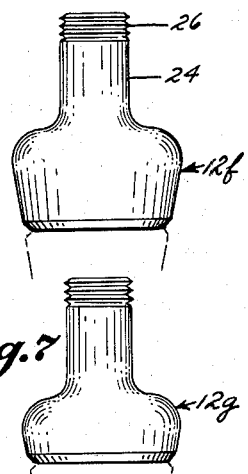
Fig.6
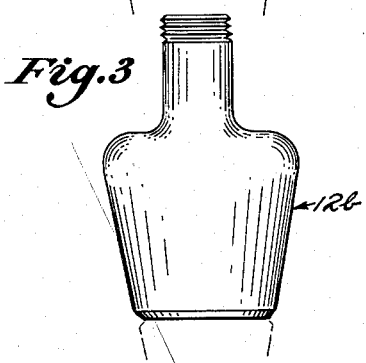
Fig.3
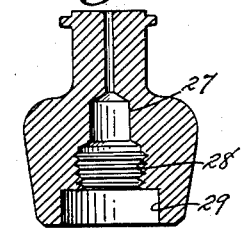
Fig.7
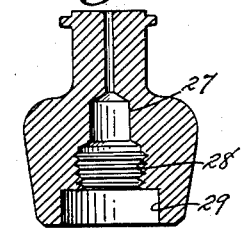
Fig.7A
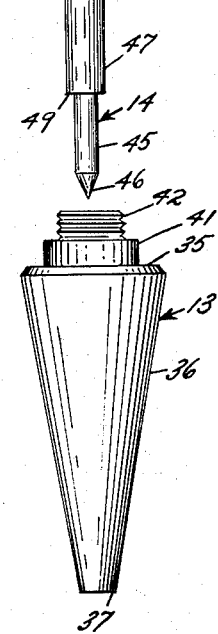
Fig.4
Fig.5
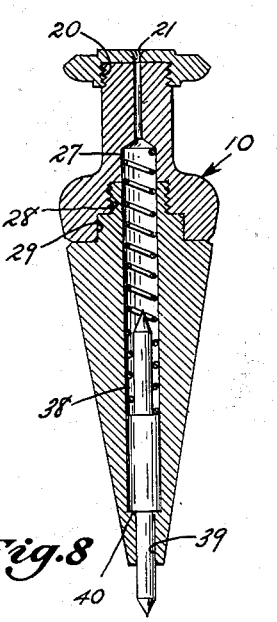
Fig.8

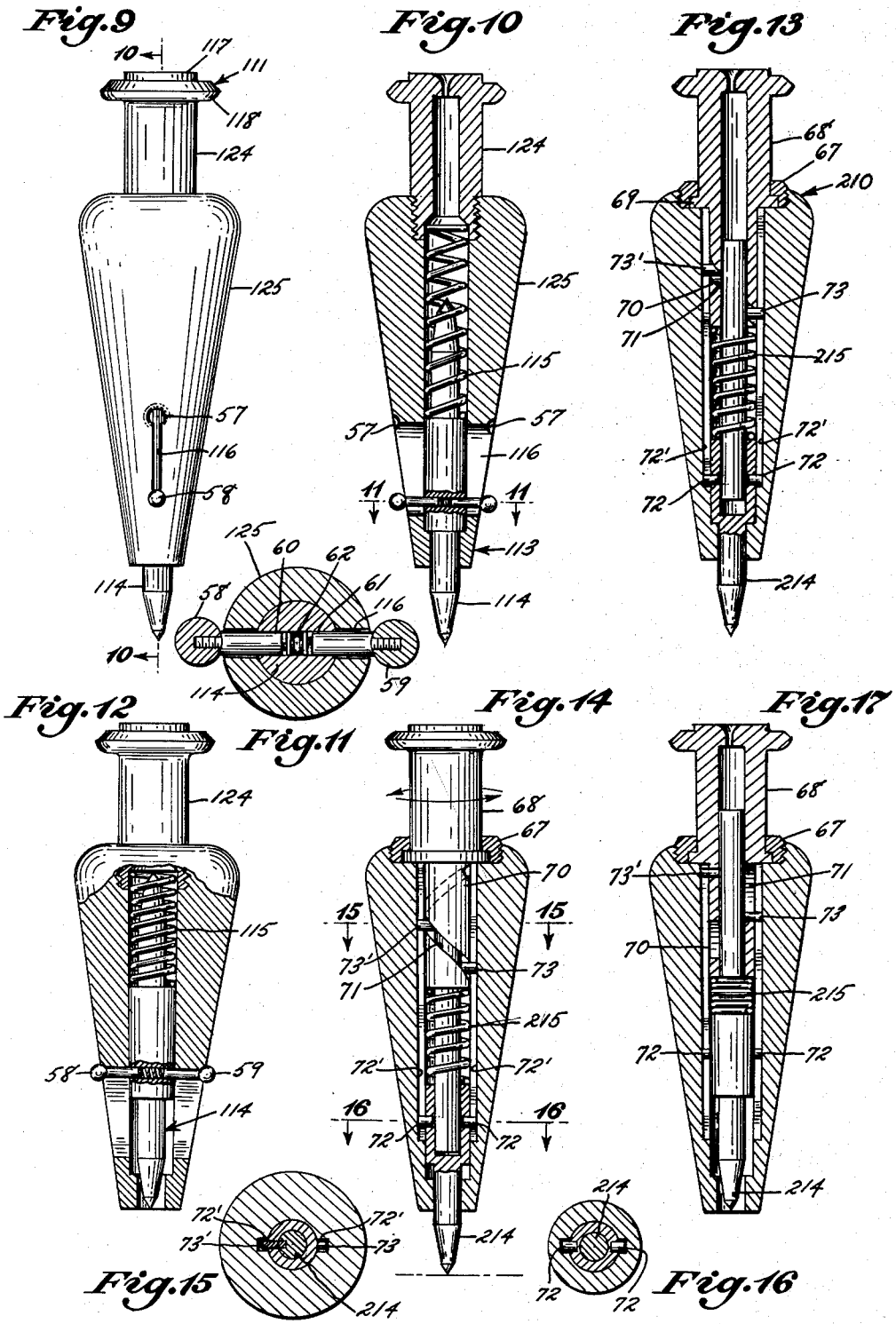

United States Patent Office 3,113,387
Patented Dec. 10, 1963

3,113,387
PLUMB BOB WITH RETRACTABLE POINT
Herbert A. Bean, Jr., Braintree, Mass., assignor to C. L. Berger & Sons, Inc., Boston, Mass., a corporation of Massachusetts
Filed Oct. 1, 1959, Ser. No. 843,802
1 Claim. (Cl. 33—216)

This invention relates generally to the field of surveying, and more particularly to an improved plumb bob of the type employed in centering the head of a transit over a specific point, or for use in conjunction in establishing a plumb line. Devices of this type are generally known in the art, and the invention lies in specific constructional details which increase the useful life of the device.

Devices of this type are normally provided with a steel point at the lower end thereof to permit accurate centering of the line. As the plumb bob has considerable weight, if the same is accidentally dropped, it will normally strike with the point downward, and upon contacting a hard surface, the point will become damaged. Once the sharpness of the point is reduced, and the shape of the point distorted, the difficulty in establishing the plumb line is materially increased to the point where the plumb bob must be discarded, or the point replaced. In conventional construction, the point is normally a part of the entire body of the device so that such replacement is not possible.

It is therefore among the principal objects of the present invention to provide an improved plumb bob having a retractable point which may be moved to a position within the body of the plumb bob wherein accidental dropping of the same will not result in damage to the point.

Another object of the invention lies in the provision of a plumb bob having a resiliently mounted point which will, upon contact with a hard surface, recede into the body of the plumb bob, resilient means serving to absorb the shock of impact so that the point is not damaged.

Still another object of the invention lies in the provision of an improved plumb bob of the class described in which means is provided for selectively locking the point within the body of the plumb bob for carrying, or storing the same in condition whereby accidental damage to the point cannot occur.

Still another object of the invention lies in the provision of improved plumb bob means possessed of the above advantages in which the cost of fabrication may be of a reasonably low order, with consequent wide sale, distribution and use.

A feature of the invention lies in the provision of interchangeable upper plumb bob bodies, wherein the weight of a plumb bob may be adjusted to suit individual requirements.

These objects and features, as well as other incidental ends and advantages, will more fully appear in the course of the following disclosure, and be pointed out in the appended claim.

In the drawings, to which reference will be made in the specification, similar reference characters have been employed to designate corresponding parts throughout the several views.

FIGURE 1 is an exploded view in elevation of a first embodiment of the invention.

FIGURE 2 is a side elevational view showing one of several interchangeable upper body portions which may be employed in conjunction with the first embodiment.

FIGURES 3, 4, 5, 6 and 7 are side elevational views showing other interchangeable upper body portions which may be employed in lieu of that seen in FIGURE 2.

FIGURE 7a is a view in elevation showing an alternate form of the construction of the first embodiment.

FIGURE 8 is a vertical central longitudinal sectional view of the first embodiment.

FIGURE 9 is a side elevational view showing a second embodiment of the invention.

FIGURE 10 is a central longitudinal sectional view of the second embodiment as seen from the plane 10—10 in FIGURE 9.

FIGURE 11 is a transverse enlarged sectional view as seen from the plane 11—11 in FIGURE 10.

FIGURE 12 is a side elevational view, partly in section, showing the second embodiment in retracted condition.

FIGURE 13 is a longitudinal sectional central view, corresponding to that seen in FIGURE 10, but showing a third embodiment of the invention.

FIGURE 14 is a similar sectional view of the third embodiment, partly in elevation, showing the device in point extended condition.

FIGURE 15 is a transverse sectional view as seen from the plane 15—15.

FIGURE 16 is a transverse sectional view as seen from the plane 16—16.

FIGURE 17 is a longitudinal sectional view corresponding to that seen in FIGURE 13, but showing the device in point retracted condition.

In accordance with the first embodiment of the invention, generally indicated by reference character 10, the device comprises broadly: a cap member 11, an upper body member 12, a lower body member 13, a slidable point member 14 and a compressible coil spring 15.

The cap member 11 is preferably formed from machined metallic stock, and includes an upper surface 17, a peripheral surface 18, a lower surface 19, a threaded bore 20, and an opening 21 communicating with said bore through which a plumb line (not shown) may extend.

The upper body member 12 is preferably of cast, machined brass or similar material, and includes a tubular portion 24 and a weighted portion 25. The tubular portion 24 is provided with threads 26 engageable within the threaded bore 20 while the weighted portion 25 includes a first bore 27 which extends through the tubular portion 24, a threaded bore 28 and a third bore 29 which serves a centering function. The weighted portion 25 includes an outer frustoconical surface 30 and a lower surface 31 which meets the surface 30 in a chamfered edge 32.

The lower body member 13 is also preferably formed from machined brass and is bounded by an upper flat surface 35, a frustoconical surface 36 and a lower surface 37. A centrally disposed bore 38 meets with a bore 39 of lesser diameter to form a seat 40 of generally annular configuration. A projection 41, and threaded portion 42 correspond to the bores 28 and 29.

The slidable point member 14 includes a first cylindrical member 43, having a pointed portion 44; a second cylindrical member 45, having a second pointed portion 46; and an enlarged cylindrical stop member 47 having flat surfaces 48 and 49 on either end thereof. As best seen in FIGURE 8, the diameter of the cylindrical members 43 and 45 corresponds to that of the counter bore 39, while the diameter of the stop member 47 corresponds to that of the bore 38. The members 43, 45 and 47 are configured such that when one of the surfaces 48—49 is in contact with the seat 40, one of the corresponding pointed portions 44 and 46 will extend outwardly from the lower surface 37.

The device is assembled as indicated in FIGURE 8, wherein the spring 15 bears upon the uppermost surface 48—49 to resiliently urge the slidable point member 14 outwardly. In this condition, should the exposed point members strike an unyielding surface, the same will telescope within the lower body member 13 against the cushioning action of the spring 15. When energy has been thus absorbed, the spring 15 will again urge outwardly the point member 14 which has thereby suffered no damage.

As devices of this type are often desired by various users in different weights, it is possible to facilitate manufacture of the device by providing a number of interchangeable upper body members 12 as indicated in FIGURES 2 to 7, inclusive. These members designated respectively by reference characters 12a, 12b, 12c, 12d, 12e, 12f, and 12g are substantially similar to the upper body member 12 and of similar shape, and varying only in the amount of mass of metal of which they are comprised. Thus during assembly of the device, should a plumb bob of given total weight be required, it is necessary only to select the properly sized upper body member and thread the same into position upon a uniformly sized lower body member 13.

Turning now to the second embodiment of the invention, parts corresponding to those of the first embodiment have been designated by similar reference characters with the additional prefix "1."

The second embodiment of the invention differs from the first embodiment principally in the inclusion of means whereby the slidable point member 114 may be maintained in a retracted position in a selective manner. To facilitate the incorporation of means to accomplish this end, the upper body member 112 and lower body member 113 are formed integrally, with the tubular portion 124 being threadedly engageable with the weighted portion 125. A vertical axis slot 116 extends through the body of the lower body member 113 the same including detent means 57 at the upper end of the slot. Headed pin means 58 and 59 are selectively engageable with the detent means 57. The pins 58 and 59 are urged toward each other by an interconnecting spring 62 of contractile type and are slidably engaged in a bore in the member 114, the same being engaged with the inner ends 60 and 61, respectively of the pins 58 and 59. Thus, when it is desired to lock the point member 114 in retracted position as indicated in FIGURE 12 in the drawings, the pins 58 and 59 are manually engaged and pushed upwardly as seen in FIGURE 12 to the point where the headed portions thereof engage the detent means 57, wherein they are maintained by the spring 61.

Turning now to the third embodiment of the invention, as illustrated in FIGURES 13 to 17, inclusive, parts corresponding to those of the first embodiment have been designated by similar reference characters with the additional prefix "2."

The third embodiment includes a threaded collar 67 which maintains the rotatable cylindrical member 68 within the body of the body member 213. The cylindrical member 68 includes a collar-engaging flange 69 disposed below a corresponding rabbet portion in the collar 67. A hollow cylindrical member 70 is formed integrally with the member 68, the same including a spiral slot 71. A first pin 72 is disposed at right angles with respect to the principal axis of the point member 214, the same riding in a pair of rectilinear grooves 72', which prevent the member 214 from rotating axially. A second pair of pins 73 and 73' perform a similar function, and in addition are engaged within the spiral slot 71 which exerts a camming action thereupon. Thus, as best seen in FIGURE 14, rotation of the cylindrical member 68 in either direction serves to cam the point member 214 to extended or retracted position, to be maintained in either position by the static frictional forces existing between the sides of the spiral slot 71 and the pins 73 and 73' created by the spring 215.

It may thus be seen that I have invented novel and highly useful improvements in plumb bobs, in which there has been provided means for protecting the relatively delicate pointed lower end thereof against the deleterious effects of accidentally dropping the same or allowing the same to strike and unyielding substantially horizontally disposed surface.

In at least some of the embodiments, the sliding point member is reversible to present a second point should the first or originally disposed point be nevertheless accidentally damaged, and upon disassembly of all of the disclosed embodiments, a damaged suit point member may be readily replaced.

The device may be manufactured using existing manufacturing techniques at a cost but slightly greater than that of existing devices known in the prior art, and owing to the inventive construction, the useful life of the same may be many times that of the conventional plumb bob.

I wish it to be understood that I do not consider the invention limited to the precise details of structure shown and set forth in this specification, for obvious modifications will occur to those skilled in the art to which the invention pertains.

I claim:

In a plumb bob, a body member having a first bore therein, said body member also having a second bore of a lesser diameter coaxially aligned with said first bore to form a seat at the lower end of said first bore; a slidable point including a first cylindrical member having a first pointed portion, a second cylindrical member having a second pointed portion, and an enlarged cylindrical stop portion having a flat surface on either end thereof, said first and second cylindrical portions having an outer diameter corresponding to the diameter of said second bore, said enlarged cylindrical portion having an outer diameter corresponding to that of said first bore, a coil spring extending into said first bore and surrounding one of said first and second cylindrical portions of said point member, and resiliently engaging said enlarged cylindrical portion to urge the same against said seat, in which position one of said pointed portions projects outwardly of said body member.

References Cited in the file of this patent

UNITED STATES PATENTS

| 1,025,828 | Paul | May 7, 1912 |
| 1,187,015 | Smith | June 13, 1916 |

FOREIGN PATENTS

| 12,345 | Great Britain | May 31, 1902 |
| 408,823 | France | Feb. 2, 1910 |